(12) United States Patent
Draim

(10) Patent No.: US 6,487,476 B1
(45) Date of Patent: Nov. 26, 2002

(54) REDUNDANT SATELLITE SYSTEM

(75) Inventor: John E. Draim, Vienna, VA (US)

(73) Assignee: ESBH, Inc., Washington, DC (US)

( * ) Notice: Subject to any disclaimer, the term of this patent is extended or adjusted under 35 U.S.C. 154(b) by 248 days.

(21) Appl. No.: 09/160,478

(22) Filed: Sep. 24, 1998

(51) Int. Cl.⁷ .............................................. H04B 7/185
(52) U.S. Cl. .................... 701/13; 701/226; 244/158 R; 455/13.1
(58) Field of Search ............... 701/13, 226; 244/158 R; 455/13.1

(56) References Cited

U.S. PATENT DOCUMENTS

| | | | | |
|---|---|---|---|---|
| 5,199,672 A | * | 4/1993 | King et al. ............. | 244/158 R |
| 5,561,837 A | * | 10/1996 | Muller et al. .............. | 455/13.1 |
| 5,615,407 A | * | 3/1997 | Barkats ..................... | 455/13.1 |
| 5,839,053 A | * | 11/1998 | Bosch et al. ................ | 455/13.1 |
| 5,894,590 A | * | 4/1999 | Vatt et al. .................. | 455/12.1 |
| 5,920,804 A | * | 7/1999 | Armbruster et al. ....... | 455/13.2 |

\* cited by examiner

*Primary Examiner*—Michael J. Zanelli
*Assistant Examiner*—Eric M Gibson
(74) *Attorney, Agent, or Firm*—Fish & Richardson P.C.

(57) ABSTRACT

A diversity satellite system using a trailer satellite concept. The main satellite is placed into orbit and the trailer satellite, typically a much smaller satellite, is in orbit with the main satellite. The main satellite and trailer satellite are communicating with one another by crosslinks. In this way, two alternative geometric configurations are possible: a first geometric configuration direct from the ground station to the first satellite, and a second geometric configuration to the main satellite from the ground station via the trailer satellite. This enables avoiding interference.

15 Claims, 1 Drawing Sheet

REDUNDANT SATELLITE SYSTEM

The present invention relates to compensation of communications when different satellite systems overlap with one another.

BACKGROUND

Satellite systems require communication between a base station on the ground and a satellite in orbit. The base station on the ground needs to track the satellite in order to receive and transmit the information to the satellite.

As more satellites are used in low to medium earth orbits, it becomes more likely that two satellites will interfere with one another. Two satellites can interfere when both enter the beam of the same base station on the same frequency. This could interrupt or degrade transmissions to both of the satellites.

A few different solutions to this problem are known. One uses so-called site diversity in which two antennas are located a certain distance apart. This has a number of problems, including requiring two large antennas, and a long terrestrial connecting link (for example tens or hundreds of miles). This is a costly solution. This distance can cause a phase shift between the transmissions to or from the two antennas.

SUMMARY

The present system defines using a special trailer satellite to avoid the interference.

BRIEF DESCRIPTION OF THE DRAWINGS

These and other aspects of the invention will now be described with reference to the attached drawings, in which.

DESCRIPTION OF THE EMBODIMENTS

Figure 1:
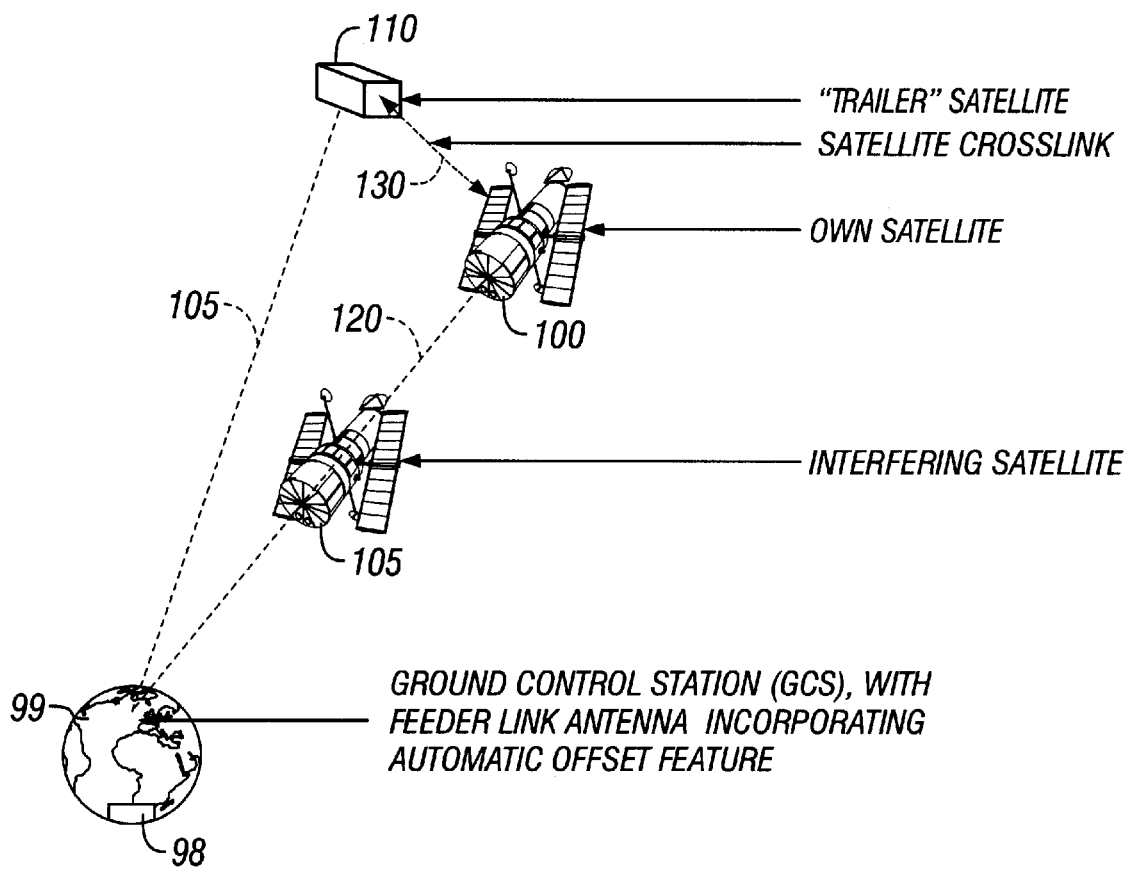
FIG. 1 shows a trailer satellite system.

This embodiment uses two satellites to communicate with the ground station 99. Each satellite has a communication element that communicates with the ground station. The main satellite 100 (one's own satellite) has an associated much smaller and sampler slave satellite 110 known as a trailer satellite. The trailer satellite 110 is of a smaller overall size than the main satellite. The trailer satellite is in a similar orbit to the main satellite, but is at a different location than the main satellite 100. The trailer 110 preferably either precedes or follows the main satellite 100 in its orbit, and hence allows clear communication to the ground station 99, even when the main satellite would interfere with an interfering satellite 105.

The main satellite 100 and trailer satellite 110 communicate along a satellite crosslink. This crosslink retransmits feeder link signals both to and from the satellite 110 and to and from the ground station 99. Hence, the ground station 99 usually communicates with the satellite 100 over main communication link 120. However, when the main satellite is being interfered with by another satellite 105, the ground station switches to communicate with trailer satellite 110 over link 125. Trailer satellite 110 communicates with main satellite 100 over satellite crosslink 130. This allows the communications and processing to be handled by the main satellite 100 as usual. As can be seen in FIG. 1, there are different geometric configurations for the main satellite to ground station versus the trailer satellite to ground station.

Main satellite 100 and trailer satellite 110 are separated by a few hundred kilometers, e.g., 100–300 k.m., to allow best operation.

The trailer satellite is preferably a miniature satellite weighing 26 to 40 kilograms (compared to the thousand kilograms of the main satellite) in the same orbit as the main satellite, but slightly disposed in time. A crosslink relay 130 is established between the two satellites 100, 110. This does not require a lot of energy. The trailer satellite 110 includes body-mounted collectors for solar energy and an internal battery. Since it is quiescent most of the time, its average power usage is quite low.

The ground station 99 includes a controller 98 which includes a priori knowledge of both the path of one's own satellite 100 and the path of a conceivably interfering satellite 105. A processor in the controller determines any time the paths are likely to interfere. Information is then transmitted from the transmitter 99 to the own satellite 100 and to the satellite 110 indicating information about an interference that will occur.

At the time of the interference, the following operation occurs. First, the transmission between the ground station 99 and the main satellite 100 is stopped. Next, the antenna at 99 is quickly moved (slewed) to the position of the trailer satellite 110. At the same time, a cross-link between the trailer satellite 110 and the main satellite 100 is established. The crosslink could be radio frequency or a laser feeder link. Thereafter, two-way communication occurs with the main satellite 100 via the path through the trailer satellite 110 over the alternate geometric path.

The trailer satellite 110 is typically of the small satellite type (typically launched by students), and could be launched for $1 million or less. Hence, this represents a very economical solution to the problem. Other solutions to the problem, such as using narrower beam widths with much larger ground antennas, or alternate sites, could prove to be orders of magnitude more expensive.

What is claimed is:

1. A redundant satellite system communicating with an earth based ground station, comprising:

a main satellite in a predetermined low earth or medium earth orbit, orbiting the earth, and having a communication element which communicates with the ground station on the earth;

a trailer satellite, having a smaller overall size than said main satellite, and in a similar orbit to said main satellite but spaced therefrom to be one of preceding said main satellite or following said main satellite in a way such that a first geometric path between the ground station and said main satellite is different than a second geometric path between the ground station and said trailer satellite, said trailer satellite and said main satellite each including auxiliary communication parts such that said trailer satellite communicates directly with said main communication satellite over a crosslink path different than either said first geometric path or said second geometric path; and a controller element, determining when communications between the ground station and the main satellite is likely to include interference, and in response to determining said interference, changing a path of communications between said ground station and said main satellite, from said first geometric path, to said second geometric path and said crosslink path, thereby forming an alternative path.

2. A system as in claim 1 wherein said main satellite and said trailer satellite are in substantially the same orbit, with a space therebetween.

3. A system as in claim 2 wherein said space is between 100–300 kilometers.

4. A system as in claim 1 wherein said interference includes interference with another satellite in a main beam of an antenna on the ground site on the same frequency as the main satellite.

5. A system as in claim 1 wherein said controller element is in the ground station.

6. A system as in claim 5 wherein said controller element includes information indicating a path of the main satellite and a path of other satellites which are likely to interfere with the main satellite.

7. A system as in claim 6 further comprising a processor in the controller, analyzing the paths and determining when interference is likely to exist, and changing the paths when said interference is likely to exist.

8. A system as in claim 1 wherein said auxiliary communication parts is one of an RF or laser.

9. A system as in claim 1 wherein said main satellite and said trailer satellite are each in elliptical orbits.

10. A system as in claim 1 wherein said trailer satellite weighs less then 40 kilograms.

11. A method of operating a diversity system, comprising:

establishing two satellites into respective predetermined orbits lower than geostationary, including a main satellite in a predetermined orbit having a communication element which communicates with a ground station on the earth, and a second communication element for crosslink communications, and a trailer satellite, spaced from said main communication satellite, said trailer satellite also having a communication element which communicates with a ground station on the earth, and a crosslink element which communicates with said crosslink element on said main satellite;

determining when communications between said ground station and said main satellite is likely to include interference;

normally communicating with said main satellite;

in response to determining said interference, changing a path of communications from said ground station to said main satellite, to said ground station to said trailer satellite via said crosslink to said main satellite thereby forming an alternative path from said ground station to said main satellite via said trailer satellite.

12. A method as in claim 11 wherein said main satellite and said trailer satellite are in substantially the same orbit but spaced from one another so that said trailer satellite either proceeds or trails main satellite.

13. A method as in claim 9 wherein said main satellite and said trailer satellite are each in elliptical orbits.

14. A method as in claim 9 wherein said trailer satellite weighs less then 40 kilograms.

15. A system comprising:

a ground station on the earth;

a main satellite in predetermined low earth or medium earth elliptical orbit, orbiting the earth, and having a communication element which communicates with the ground station on the earth;

a trailer satellite, having a smaller overall size than said main satellite, and weighing less than 40 kilograms, and in a similar orbit to said main satellite but spaced therefrom to be one of preceding said main satellite or following said main satellite in a way such that a first geometric path between the ground station and said main satellite is different than a second geometric path between the ground station and said trailer satellite, said trailer satellite and said main satellite each including auxiliary communication parts such that said trailer satellite communicates directly with said main communication satellite over a crosslink path different than either said first geometric path or said second geometric path; and a controller element, having a processor determining when communications between the ground station and the main satellite is likely to include interference, and, in response to determining said interference, changing a path of communications between said ground station and said main satellite, from said first geometric path, to said second geometric path and said crosslink path, thereby forming an alternative path.

* * * * *